United States Patent
Payen et al.

(12)

(10) Patent No.: US 6,851,351 B2
(45) Date of Patent: Feb. 8, 2005

(54) COOKING APPLIANCE HAVING A LID THAT IS SEPARABLE FROM THE FILTER DEVICE

(75) Inventors: Jean-Marc Payen, Quetigny (FR); Bernard Bouly, Dijon (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 10/239,911

(22) PCT Filed: Jan. 29, 2002

(86) PCT No.: PCT/FR02/00337

§ 371 (c)(1),
(2), (4) Date: Jan. 13, 2003

(87) PCT Pub. No.: WO02/062188

PCT Pub. Date: Aug. 15, 2002

(65) Prior Publication Data

US 2004/0007136 A1 Jan. 15, 2004

(30) Foreign Application Priority Data

Feb. 2, 2001 (FR) .............................. 01 01551

(51) Int. Cl.[7] .......................... A47J 37/06; A47J 37/08; A47J 37/12
(52) U.S. Cl. .............................. 99/403; 99/330; 99/408; 55/DIG. 36
(58) Field of Search .................. 99/337, 338, 326–335, 99/339–342, 403–417, 444–450, 470, 472, 486, 489; 126/391.1, 299 D, 377.1, 299 R; 219/430–432, 435, 436, 429, 440, 441, 385, 386, 492–494; 210/167, DIG. 8; 220/912, 316; 55/315, 309.1, DIG. 36; 426/438, 523; 95/216, 217, 206, 141, 220

(56) References Cited

U.S. PATENT DOCUMENTS

| 4,636,618 A | | 1/1987 | Jenicot ........................ 219/441 |
| 4,995,312 A | * | 2/1991 | Leiros .......................... 99/411 |
| 6,283,015 B1 | * | 9/2001 | Kwon et al. ................... 99/337 |
| 6,499,390 B1 | * | 12/2002 | Huang ......................... 99/331 |

FOREIGN PATENT DOCUMENTS

| DE | G 94 16 793.1 | 2/1995 | ............ A47J/37/12 |
| EP | 1 029 490 | 8/2000 | ............ A47J/37/12 |

* cited by examiner

Primary Examiner—Timothy F. Simone
(74) Attorney, Agent, or Firm—James W. Kayden; Thomas, Kayden, Horstemeyer & Risley, LLP

(57) ABSTRACT

A food-cooking appliance having a main body in which a cooking bowl (6) is mounted and a lid (7) removably mounted to the main body and designed to close the main body in a substantially airtight manner during cooking. The food-cooking appliance also includes odor treatment means (10) for treating cooking odors, which means are associated with the lid (7), and heater means. The lid (7) is removably mounted to be removable from the main body and from the cooking odor treatment means (10) so as to be separable simultaneously from the main body and from the odor treatment means (10).

20 Claims, 2 Drawing Sheets

COOKING APPLIANCE HAVING A LID THAT IS SEPARABLE FROM THE FILTER DEVICE

TECHNICAL FIELD

The present invention relates to the general technical field of appliances for heating or cooking food, such as rice cookers, for example, which appliances are equipped with means for treating cooking odors to avoid discharging unpleasant odors into the surroundings.

BACKGROUND

In order to reduce emission of unpleasant cooking odors into the immediate surroundings of a household cooking appliance, it has already been proposed firstly to close the lid onto the cooking bowl of the appliance in substantially airtight manner in order to avoid discharging streams from the cooking that convey unpleasant odors directly into the atmosphere, and secondly to equip the lid generally or some other portion of the appliance with odor treatment means filtering the cooking stream before it is discharged into the atmosphere.

In addition, there is an increasing demand in the field of small household electric appliances for appliances that are particularly simple to use and to clean, and, for example, that do not require complex assembly or disassembly operations in order to clean all or part of the appliance. The user greatly appreciates having the possibility of cleaning all or some of the parts of a cooking appliance directly in the dishwasher.

It is thus known, in particular in the field of appliances for frying in oil baths, that it is possible to equip the lid of such an appliance with a filter that is entirely made of metal, so that the lid and the incorporated metal filter can be washed directly in the dishwasher. That type of appliance thus does not suffer from any drawbacks as regards manipulation and simplicity of use and of cleaning. However, the use of filters that are entirely made of metal gives rise to the cooking stream being treated incompletely because metal filters allow fat particles merely to be deposited in the filter, without performing physico-chemical treatment on the particles and molecules that generate odors.

That is why it has already been proposed to replace metal filters with filter cartridges suitable for performing odor treatment that is more elaborate and fuller. The filter cartridge is then mounted removably in a recess in the lid of the deep fryer, as in Patent Application WO-99/08581. After a cooking cycle, when the user wishes to clean the lid of the deep fryer by washing it in the dishwasher, the user must remove the filter cartridge from the lid before washing the lid in the dishwasher. In practice, it has been observed that, since the filter cartridge is generally concealed, at least in part, users nearly always forget to remove the filter cartridge before washing the lid in the dishwasher. Forgetting the filter in that way gives rise to total or partial destruction of the filter cartridge or to subsequent problems in operating the deep fryer, involving in particular the presence of water in the frying oil.

Finally, it has also been proposed to implement lids for cooking appliances and in particular deep fryers that are removable and can be washed in the dishwasher directly because no incorporated filter device or system is mounted in such lids. In such cases, the odor treatment or filter system is disposed in the bottom portion of the appliance, and not in the lid. Although generally satisfactory, such appliances are quite difficult to design and manufacture insofar as the filter system is complex to implement because, instead of treating the cooking stream naturally at the top of the appliance, it is necessary to recycle said stream towards the bottom portion in which the filter system is situated.

SUMMARY OF THE INVENTION

An object assigned to the invention is therefore to remedy the various above-mentioned drawbacks of the prior art, and to provide a novel food-cooking appliance including odor treatment means associated with the lid, said appliance being particularly simple to design and to use, while being easy to clean, and enabling the odor treatment means to operate as well as possible.

Another object of the invention is to provide a novel food-cooking appliance that is particularly simple and robust, while being simple to open.

Another object of the invention is to provide a novel food-cooking appliance that is particularly convenient and practical to use.

Another object of the invention is to provide a novel food-cooking appliance in which the operation of separating the lid from it is particularly simple to achieve.

Another object of the invention is to provide a novel food-cooking appliance which is particularly well designed ergonomically to make it easier to clean.

The objects assigned to the invention are achieved by means of a food-cooking appliance including: a main body in which a cooking bowl is mounted and a lid mounted to be removable from the main body and designed to close the main body in a substantially airtight manner during cooking. The food-cooking appliance also includes odor treatment means for treating cooking odors associated with the lid and heater means. The lid is removably mounted to be removable from the main body and from the cooking odor treatment means so as to be separable simultaneously from the main body and from the odor treatment means.

said food-cooking appliance being characterized in that the lid is removably mounted to be removable from the main body and from the cooking odor treatment means so as to be separable simultaneously from the main body and from the odor treatment means.

BRIEF DESCRIPTION OF THE DRAWINGS

Other objects and advantages of the invention appear in more detail on reading the following description given with reference to the accompanying drawings which are given merely by way of non-limiting and illustrative examples, and in which.

DETAILED DESCRIPTION

Figure 1:
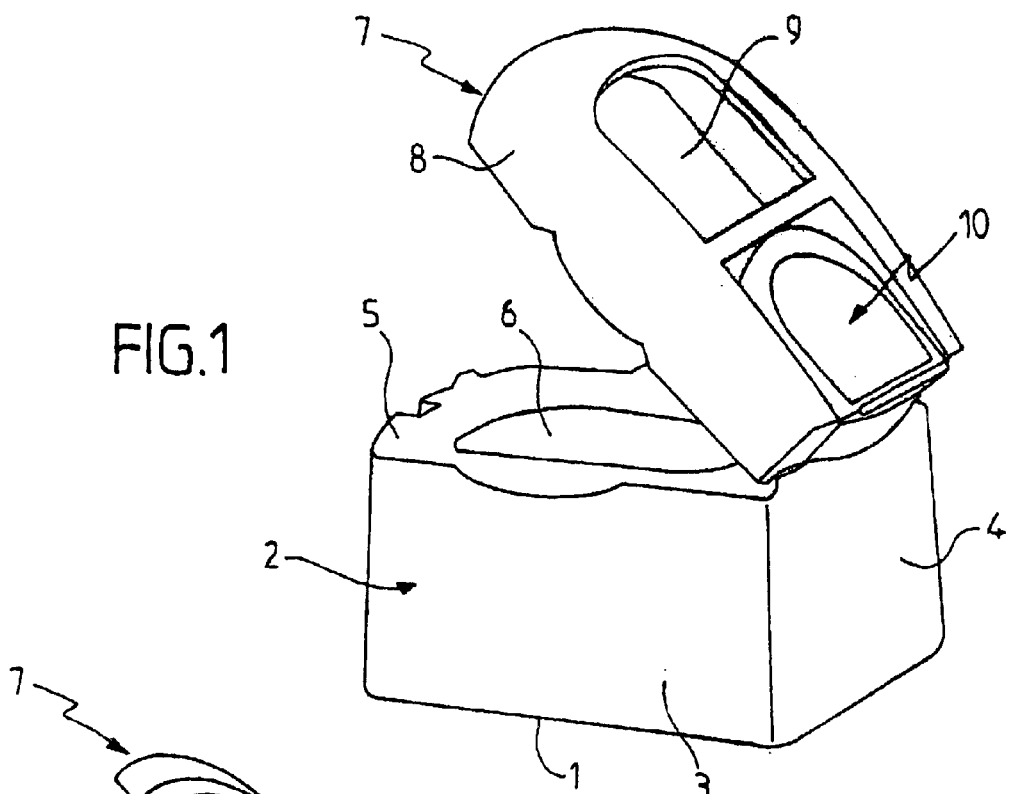
FIG. 1 is an overall perspective view of a food-cooking appliance of the invention, namely a deep fryer in this example, the lid being in the open position.

In the embodiments shown in FIGS. 1 to 4, the food-cooking appliance of the invention is constituted by a deep fryer designed to deep fry food of all types in fat, such as in an oil bath or in solid fat. In the meaning of the invention, it should however be understood that the term "food-cooking appliance" covers all household food-cooking appliances that are suitable for cooking food, the use of the invention in deep-frying appliances of the deep fryer type merely being a preferred use, and the invention is naturally also applicable to other uses such as rice cookers, or multi-purpose cookers, provided that such cooking appliances cook in a substantially airtight enclosure.

The food-cooking appliance shown in FIGS. 1 to 4, which is an electric deep fryer in this example, has a base 1 forming the stand on which the appliance is designed to stand on a surface or on a support. The base 1 is generally integral with an outer skirt 2 or mounted on said skirt, which is made, for example, of a metal material or of a plastics material that withstands high temperatures, and which forms the outer casing of the deep fryer. In conventional manner, the outer skirt 2 is made of a cheap plastics material that does not withstand high temperatures well, such as polypropylene, and that is not capable of withstanding the heat energy dissipated continuously by the high-temperature heater elements that are conventionally used in electric deep fryers and that are generally disposed at the bottom in the vicinity of the base 1.

The heater means of the appliance (not shown in the figures) may be conventionally made up of metal-clad elements or equivalent elements also connected in conventional manner to an electrical connection block (not shown) and to electrical wiring making it possible to connect the appliance to a main source of electricity. In a manner also known to the person skilled in the art, the cooking appliance of the invention is provided with all of the electrical and electronic safety devices such as temperature sensors, fuses, etc. that are required when designing such appliances. Since those elements are well known to the person skilled in the art, they are not described in greater detail in the description below.

The outer skirt 2 may be of any suitable and pleasing geometrical shape, e.g. circular, oval, or rectangular, so as to define side faces 3 and front and back faces 4, for example.

The top portion of the outer skirt 2 is advantageously provided with an annular ring 5 forming the mechanical coupling between the top portion of the outer skirt 2 and a cooking bowl 6 that is generally made of metal, serving to receive the fat such as the frying oil and the food to be fried. As is well known to the person skilled in the art, e.g. from Patent Document FR-87 06728, the annular ring is advantageously made of a thermally insulating material that continuously withstands the temperatures at which the deep fryer is used, e.g. polyamide, polyester, polybutylene terephthalate (PBTP) or the like, and said annular ring advantageously supports the cooking bowl 6, at least in part.

In the meaning of the invention, the base 1, the outer skirt 2, the annular ring 5, and any device mounted on or in or secured to these three elements, such as the hinge whereby the lid is hinged to said main body, generally form the main body of the food-cooking appliance of the invention.

In the invention, the deep fryer has a lid 7 which is mounted to be removable from the main body of the deep fryer and which is designed to close said main body during cooking in a substantially airtight manner, e.g. by means of sealing gaskets (not shown in the figures).

Figure 3:
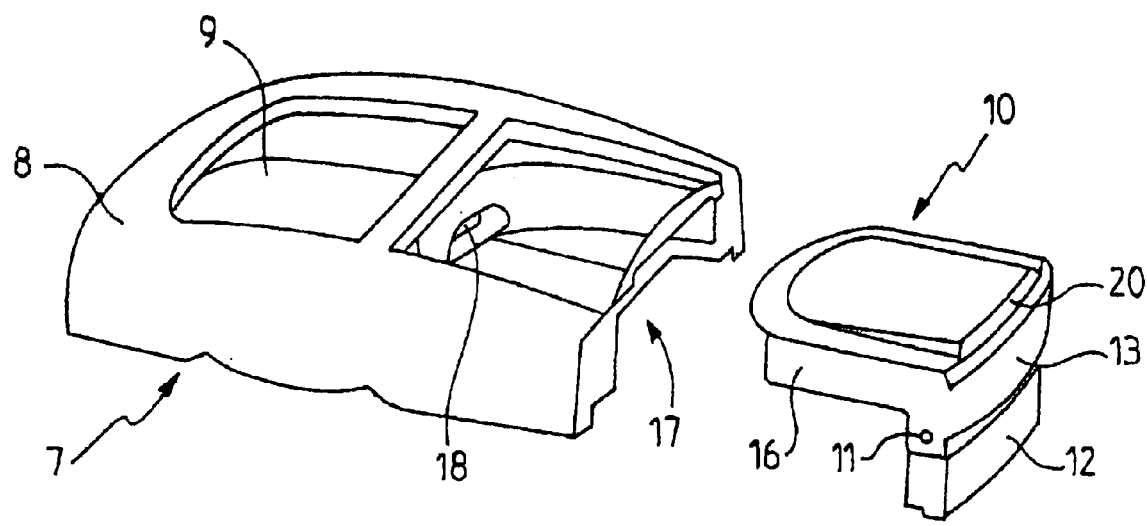
FIG. 3 is a perspective view of an embodiment detail of the lid of an appliance of the invention, in a position in which it is separated from odor-treatment means.

Advantageously, and as shown in FIGS. 1 and 3 in particular, the top face 8 of the lid 7 may be provided with an inspection window 9 making it possible to check the progress of cooking or of deep frying during a cooking cycle, and when the lid is closed on the main body.

Cooking food in closed surroundings, be it by steaming or by frying, generates characteristic and often unpleasant odors resulting from the chemical reactions related to the cooking proper, and in particular to the emission of volatile organic substances.

For this reason, the food-cooking appliance of the invention includes and is equipped with odor treatment means 10 for treating cooking odors, which means are associated with the lid 7, it being understood, in the meaning of the invention, that the term "associated" is used to indicate that, when the lid 7 is in the closed position, the food is cooked in closed surroundings, and all of the streams from the cooking pass through the odor treatment means 10 to be treated therein. In the meaning of the invention, associating the cooking odor treatment means 10 with the lid 7 covers fitting said odor treatment means 10 in a manner such as to make it possible for the lid 7 and for said means 10 to perform this odor treatment function together.

In a manner known per se, the cooking odor treatment means 10 are formed by any conventional treatment means known to the person skilled in the art, and, for example, by a charcoal filter or by a heat treatment device such as a catalytic device.

Figure 2:
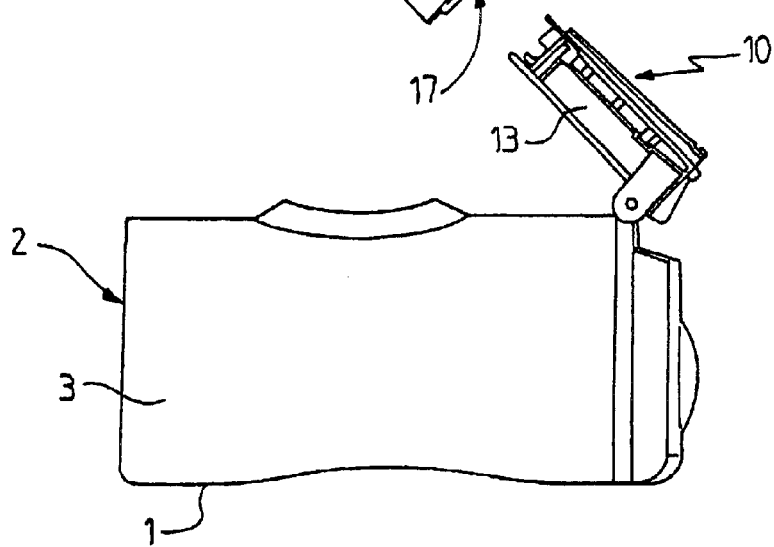
FIG. 2 is a side view of a deep fryer of the invention, corresponding to the deep fryer of FIG. 1, the lid having been separated from the main body of the deep fryer.

According to an important characteristic of the invention, the lid 7 is removably mounted, i.e. mounted to be removable from the main body and from the cooking odor treatment means 10, so that it can be separated simultaneously from the main body and from the odor treatment means 10, as shown, for example, in FIG. 2.

By means of this assembly feature, the user can, in a single operation, and by a single action, separate the lid from the other elements of the cooking appliance, and in particular from the odor treatment means 10. This feature makes it possible, by means of particularly simple manipulations that do not require the use of any special tools, to extract the lid 7 so that it can be washed directly in a dishwasher without any risk of the odor treatment means 10 being washed with it in the dish washer, since said means are automatically separated from the lid 7 during the operation of extracting and separating the lid 7.

In the invention, the odor treatment means 10 are secured to or integral with the main body of the appliance, e.g. in fixed manner, optionally with it being possible to disassemble or to extract them from said main body, the essential requirement being that, while the user is disassembling or removing the lid 7 without using any special tool, and by means of a single action, the odor treatment means 10 remain fixed to or integral with the main body, while optionally making it possible subsequently to disassociate these two elements.

In a particularly advantageous version of the invention, and as shown in FIGS. 2 to 3 in particular, the lid 7 is mounted on the main body via a hinge 11 which is incorporated in the odor treatment means 10.

In a particularly advantageous manner, the odor treatment means 10 are formed by a hinge subassembly comprising a fixing part 12 designed to form the interface with the main body of the appliance, and therefore secured to or integral with said body, and a treatment part 13 corresponding to the part for performing the odor treatment proper, the two parts 12, 13 being hinged to each other via the hinge 11.

In this particularly advantageous variant of the invention, the lid 7 is therefore mounted to pivot about a hinge by being mounted directly on the odor treatment means 10 which incorporate and include the hinge of said lid. In this preferred variant, the odor treatment means 10 are thus also mounted to move and pivot, at least in part, thus following the opening and closing movements of the lid 7 via the treatment part 13 which is associated with the cover 7, and with its movements. By having a hinge subassembly with a fixing part 12 for fixing to the main body, it is possible to incorporate into the subassembly suitable opening-assistance means such as springs, brakes, and safety and detection systems suitable for ensuring that the cover 7 pivots or opens progressively.

By way of a variant, it is however possible to implement another assembly configuration in which the treatment means 10 are associated with the main body of the appliance, such other assembly configuration implying mounting said treatment means 10 in fixed manner on the main body without it being possible for said means to pivot about the hinge 11. In such a variant (not shown in the figures), the odor treatment means 10 may be constituted of a single part fixed directly and permanently to the main body, without it being possible for it to follow the movements of the lid 7. In this assembly configuration, the lid 7 is hinged conventionally on a hinge that is independent from the treatment means 10, and it fits onto the odor treatment means 10 in the closed position by having a complementary shape.

Figure 4:
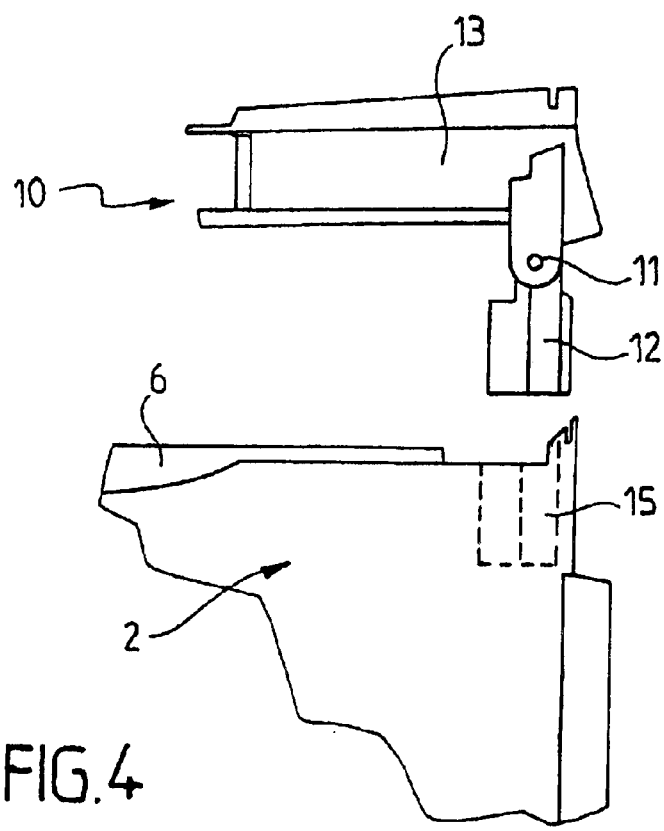
FIG. 4 is a fragmentary side view showing an embodiment detail of a food-cooking appliance of the invention, showing how the odor treatment means are mounted on the main body of the appliance.

As shown in FIG. 4, which shows the preferred version of the invention, the fixing part 12 is advantageously mounted on the main body by fitting into a cavity 15 provided for this purpose. By way of a variant, other types of assembly configuration may be considered, and, for example, screw-fastening or some other equivalent means may be used. Preferably, regardless of the type of fixing considered, the assembly is disassemblable, and preferably disassemblable by the user, without any special equipment.

As shown in the figures, the treatment part 13 includes at least a portion of the odor filter element (not shown in detail in the figures) which is inserted into a chamber 16, e.g. that is substantially rectangular block shaped, and that forms the main portion of the treatment part 13. In the preferred variant embodiment shown in FIGS. 1 to 4, the lid 7 is therefore removably mounted on the odor treatment means 10, and in particular on the treatment part 13, all of the odor treatment or filter elements being incorporated in said part 13 and thus in the hinge subassembly.

Naturally, by way of a variant, the odor treatment and/or filter elements may be split up and mounted in part on the lid 7 and in part on the hinge subassembly, and united into a functional unit when the lid 7 is fitted.

In a particularly advantageous variant of the invention, the lid 7 is removably mounted by the lid 7 and the treatment part 13 interfitting. As shown in particular in FIG. 3, for this purpose, the lid 7 is provided with a recess 17 that is open over its back portion to enable the treatment part 13 to be inserted therein by interfitting. As shown, the recess 17 is of shape and dimensions complementary to the treatment part 13 so as to make it possible for the interfitting to be achieved merely by applying a force in translation, and the recess is open over its bottom portion situated vertically above the cooking bowl 6, and is closed over its top portion, with aeration orifices being provided therein.

The recess 17 is provided with a communication orifice 18 for communicating with the cooking surroundings and opening out above the cooking bowl 6, so as to enable the streams from cooking to penetrate into the odor treatment means 10 via said orifice 18. To this end, the treatment means 10, in particular the treatment part 13, are provided with an inlet orifice (not shown in the figures) that comes into alignment with the orifice 18 when the odor treatment means 10 is fully inserted into the recess 17. Similarly, in its back portion, the odor treatment means 10 are provided with an outlet 20 for the stream that has been subjected to the anti-odor treatment.

After one or more cycles of use of the appliance, when the user wishes to separate the lid 10 from the remainder of the cooking appliance, the user opens the lid 7, e.g. to the inclined position shown in FIG. 2, or to a substantially vertical position given by the opening assistance means, and then, by applying axial traction in the direction F1, the user separates the lid 7 from the remainder of the deep fryer. During this extraction operation, the odor treatment means 10 comes out of the recess 17 because it is secured to or integral with the remainder of the appliance, thereby releasing the lid 7. Without any special manipulation, the lid 7 is then removed from the odor treatment means and can be placed directly in a dishwasher.

Once the lid 7 has been washed, and after the recess 17 has been aligned with the odor treatment means 10 and mutual axial docking has been performed between the two parts, the user can, merely be pressing in the direction F2, bring said recess 17 to encase the odor treatment means 10, thereby reinserting said odor treatment means and re-connecting the two parts together in a substantially airtight manner.

By way of an additional variant (not shown in the figures), it is naturally possible to consider achieving the connection between the lid 7 and the odor treatment means 10 by causing a connection interface that is secured to or integral with the lid 7 to be inserted into the odor treatment means 10, thereby achieving a connection that is the reverse of the connection shown, in particular in FIG. 3. In this additional variant, the odor treatment means 10 are thus not inserted into the lid 7, rather the lid is itself inserted via an interconnection part into the odor treatment means 10.

What is claimed is:

1. A food-cooking appliance comprising:
   a main body in which a cooking bowl (6) is mounted;
   a lid (7) removably mounted to be removable from the main body and designed to close said main body in substantially airtight manner during cooking;
   odor treatment means (10) for treating cooking odors, which means are associated with the lid (7);
   heater means; and
   wherein the lid (7) is removably mounted to be removable from the main body and from the odor treatment means (10) so as to be separable simultaneously from the main body and from the odor treatment means (10).

2. The appliance according to claim 1, wherein the odor treatment means (10) are secured to the main body.

3. The appliance according to claim 2, wherein the lid (7) is mounted on the main body via a hinge (11) which is incorporated into the odor treatment means (10).

4. The appliance according to claim 3, wherein the odor treatment means (10) are formed by a hinge subassembly made up of a fixing part (12) secured to the main body, and of a treatment part (13), the two parts being hinged together via the hinge (11).

5. The appliance according to claim 4, wherein the fixing part (12) is removably mounted on the main body by interfitting.

6. The appliance according to claim 4, wherein the treatment part (13) includes an odor filter element at least in part.

7. The appliance according to claim 1, wherein the lid (7) is removably mounted on the odor treatment means (10).

8. The appliance according to claim 6, wherein the lid (7) is mounted on the treatment part (13).

9. The appliance according to claim 8, wherein the lid (7) is removably mounted by mutual interfitting of the lid and of the treatment part (13).

10. The appliance according to claim 9, wherein the lid is provided with a recess (17) open over a back portion to enable the treatment part (13) to be inserted therein by interfitting.

11. The appliance according to claim 10, wherein the recess (17) is provided with a communication orifice (18) for communicating with an interior portion of the appliance and serving to be aligned with a corresponding inlet orifice provided in the treatment part (13).

12. The appliance according to claim 1, wherein the appliance further comprises a deep fryer.

13. A food-cooking appliance comprising:

a main body in which a cooking bowl (6) is mounted;

odor treatment means (10) for treating cooking odors, said odor treatment means (10) being mounted to said main body;

a lid (7) removably mounted to both the main body and to the odor treatment means (10), the lid being designed to close the main body in a substantially airtight manner during cooking;

heater means; and wherein the lid (7) is simultaneously separable from the main body and from the odor treatment means (10).

14. The appliance according to claim 13, wherein the odor treatment means (10) are removably mounted to the main body.

15. The appliance according to claim 14, wherein the lid (7) is mounted on the main body via a hinge (11) which is incorporated into the odor treatment means (10).

16. The appliance according to claim 15, wherein the odor treatment means (10) are formed by a hinge subassembly made up of a fixing part (12) secured to the main body, and of a treatment part (13), the two parts being hinged together via the hinge (11).

17. The appliance according to claim 16, wherein the fixing part (12) is removably mounted on the main body by interfitting.

18. The appliance according to claim 16, wherein the lid (7) is mounted on the treatment part (13).

19. The appliance according to claim 13, wherein the lid (7) is removably mounted on the odor treatment means (10).

20. The appliance according to claim 13, wherein the appliance further comprises a deep flyer.

* * * * *